Sept. 16, 1941.   E. L. ANDERSON   2,255,908
RESILIENT MOTOR SUPPORT AND BELT-TIGHTENING APPARATUS
Filed Jan. 10, 1939   2 Sheets-Sheet 1
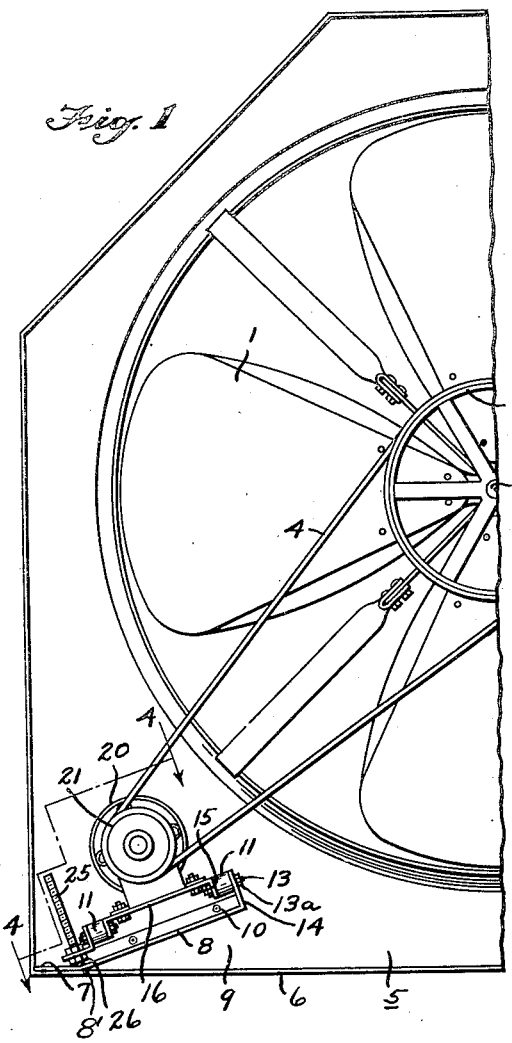
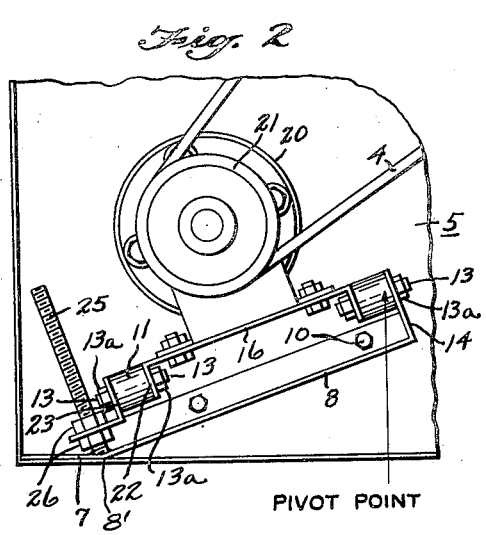
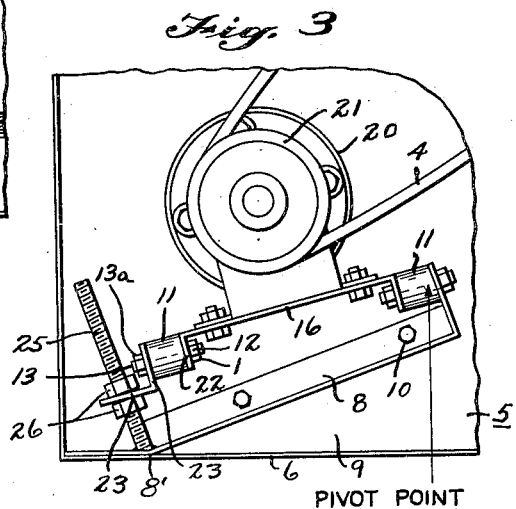
INVENTOR.
EDWARD L. ANDERSON
BY
ATTORNEYS Sept. 16, 1941.   E. L. ANDERSON   2,255,908
RESILIENT MOTOR SUPPORT AND BELT-TIGHTENING APPARATUS
Filed Jan. 10, 1939    2 Sheets-Sheet 2
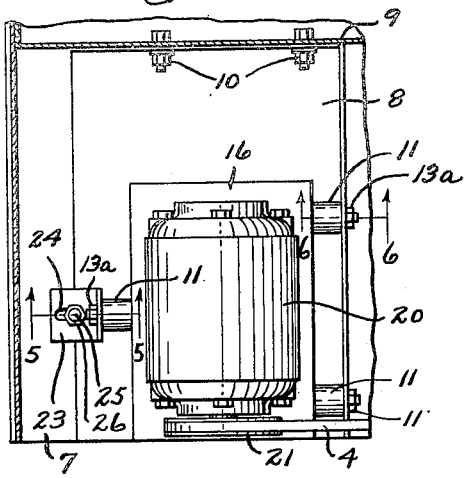
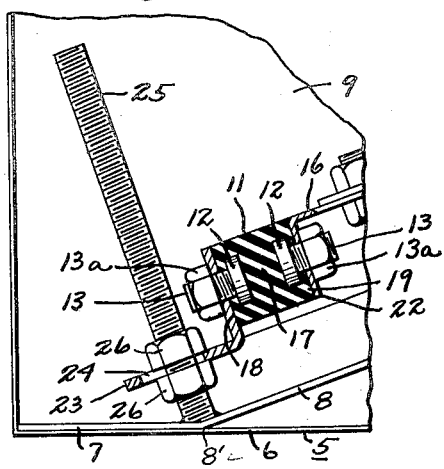
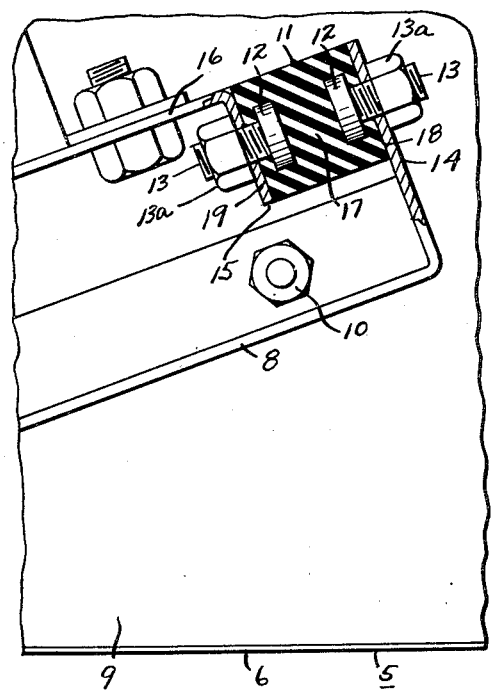
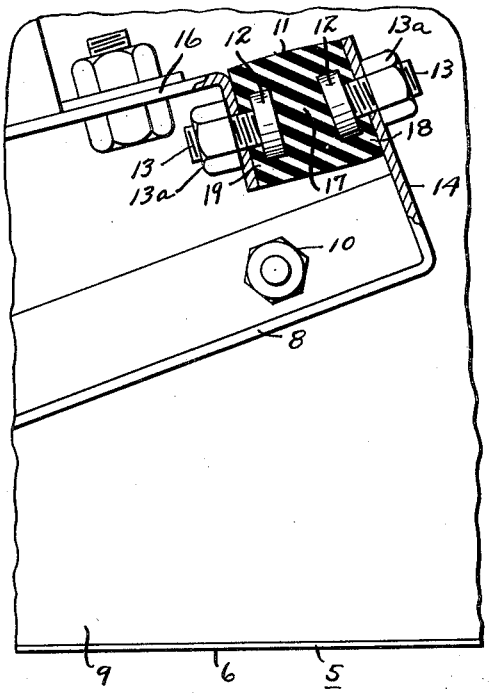
INVENTOR.
EDWARD L. ANDERSON
BY
ATTORNEYS Patented Sept. 16, 1941

2,255,908

UNITED STATES PATENT OFFICE 2,255,908

RESILIENT MOTOR SUPPORT AND BELT-TIGHTENING APPARATUS

Edward L. Anderson, Detroit, Mich., assignor to American Blower Corporation, Detroit, Mich., a corporation of Delaware Application January 10, 1939, Serial No. 250,249

6 Claims. (Cl. 248—23)

My invention relates to ventilating fans and in particular to an adjustable mounting for a driving motor for a ventilating fan.

It is the object of my invention to provide a vibration proof, sound proof motor mounting that is universally adjustable so that irrespective of the position of the adjustment, the motor will be insulated from the fan and fan casing while the adjustment will permit the positioning of the motor for maintaining the belt with requisite tightness.

It is a further object of this invention to provide a motor mounting comprising one or more resilient connections having attaching bolts, normally in alignment but which can be moved out of alignment during the adjusting operation and still continue to function as silencers, vibration dampeners and as supports.

It is the object of my invention to provide a resilient connection which acts both as a connection and as a support and provides a resilient pivot about which the motor support is adjusted.

It is an object of my invention to provide rubber connectors, the ends of which are bolted to a support and to the motor. The bolts connecting the rubber members are spaced sufficiently far apart so that the rubber can bend and act as a pivot.

Referring to the drawings:

Figure 1 is an end elevation of the fan from the driving side showing a part of the casing of the fan, the motor, the driving belt and driving and driven pulleys and the support for the motor and the driving pulleys.

Figure 2 is a detail view of said support in its lowered position.

Figure 3 is a similar view in its upper adjustable position.

Figure 4 is a section on the line 4—4 looking in the direction of the arrows of Figure 1 showing the motor and its supports in plan view.

Figure 5 is a section on the line 5—5 of Figure 4 looking in the direction of the arrows.

Figure 6 is a section on the line 6—6 of Figure 4 looking in the direction of the arrows.

Figure 7 is a similar view to that of Figure 6 showing the support elevated so that the rubber connections are deflected and act as a pivot.

Referring to the drawings in detail, I designates a fan mounted on a fan shaft 2, on which is mounted the driving pulley 3 that is driven by the belt 4.

The fan is mounted in a fan casing 5 of any desired character. This fan casing is provided with a flange 6 to which it is attached by bolts or by a welding plate 7 that is bent angularly as at 8' and bolted to the back plate 9 of the fan casing by the bolts 10.

This is the supporting plate for the fan driving motor. The problem is to prevent transmission of vibration and the causing of noise by the driving motor, to maintain the belt 4 adjusted in a taut condition and to prevent metal-to-metal contact between the motor and its support to reduce vibration and noise.

To this end there is mounted on the supporting plate 8 a plurality of rubber members 11, to which are anchored, preferably by vulcanization, the heads 12 of bolts 13. These bolts project through the flange 14 of the support 8 on one side and through the flange 15 of the motor supporting plate 16 on the other side.

The bolt heads 12 are sufficiently spaced from one another so that there is an appreciable area of rubber 17 between them. These bolts hold the faces 18 and 19 of this rubber block 11 firmly in engagement with the respective flanges 14 and 15. Thus these connections act not only as supports and shock absorbers and vibration dampeners, but also act as resilient pivots.

The other end of the plate 16 is provided with a flange 22, which likewise carries a bolt or bolts with heads 12 and threaded shafts 13. The nuts 13a in each case retain the bolts in position. The rubber block, or blocks, mounted on the flange 22 have connected thereto an angular member 23 which is provided with a slot 24 through which projects a bolt 25 that is threaded. On this bolt are the lock nuts 26 for positioning the plate 16 so as to adjust it about the resilient pivot formed by the blocks 11.

In this manner the motor plate 16 is insulated by the rubber blocks 11 at both ends while it can be adjusted about one or more of these blocks as resilient pivots.

The tendency of the plate to move axially of the blocks 11 and any resulting vibration is readily absorbed and this is true whether the resilient blocks are bent at their longitudinal axes or not. The joint between the supporting plate and the platform 16 is always tight and noiseless. The resiliency of the blocks has the advantage in that it makes for a resilient tightening means for maintaining the belt tight and provides sufficient yield to accommodate the movement of the belt 4 on the driving and driven pulleys.

It will be understood that I desire to comprehend within my invention such modifications as may be necessary to adapt it to varying conditions and uses.

Having thus fully described my invention, what I claim as new and desire to secure by Letters Patent, is:

1. In combination, a motor support having a flange at one end and adjusting means at the other end, a motor for driving a belt and a motor platform having flanges at each end, rubber blocks bolted on each end of said flanges of the motor platform, and means to bolt some of those blocks to said support flange and other of said blocks to said adjusting means, the bolts in each of said blocks being so arranged that said bolts are separated by said rubber blocks, said adjusting means adjustably supporting the adjustable end of said motor platform in order to tighten the belt by pivoting said platform about the blocks secured to said support.

2. In combination, a main plate, a motor for driving a belt and a motor supporting plate arranged in spaced relationship to said main plate, interconnecting blocks of resilient material connecting adjacent ends of said plates and means of attaching said blocks to respective plates so as to leave a portion of the resilient means therebetween, means to adjustably support and position the other ends of the plates with respect to one another and similar resilient blocks between said adjusting means and the motor supporting plate whereby the motor is moved with respect to said main plate and the belt is tightened.

3. In combination, a main plate, a motor for driving a belt and a motor supporting plate arranged in spaced relationship to said main plate, longitudinally disposed interconnecting blocks of resilient material connecting adjacent ends of said plates and means for attaching said blocks to respective plates so as to leave a portion of the resilient means therebetween, means to adjustably support and position the other ends of the plates with respect to one another and similar resilient blocks between said adjusting means and the motor supporting plate whereby the motor is moved with respect to said main plate and the belt is tightened.

4. In combination, a main plate having a flange at one end and an adjusting bolt at the other, a spaced motor supporting plate having end flanges and a motor for driving a belt, longitudinally disposed rubber members interposed between the flanges of said plates and bolted to the respective plates so as to leave rubber between the bolts, a similar rubber means bolted to the other end of the motor supporting plate and a flange adjustably mounted on said adjusting bolt and secured through the rubber means to said motor supporting plate whereby the motor is moved with respect to said main plate and the belt is tightened.

5. In combination in a motor support, of a supporting means, a motor supporting plate, a motor for driving a belt and resilient shock absorbing and pivot means longitudinally disposed on either end of said motor supporting plate to form resilient pivots and motor adjusting means for supporting said motor supported plate in a variety of positions whereby the motor is moved with respect to said supporting means and the belt is tightened.

6. In combination, a motor for driving a belt and a main support, a motor supporting plate resiliently connected to said main support on one side thereof at spaced intervals, and means on the other side of said motor supporting plate, intermediate the ends thereof, comprising resilient means and means for adjustably supporting said motor supporting plate through said resilient means whereby said adjustment is made and the motor is moved with respect to the main support and the belt is tightened, the motor supporting plate pivoting upon the spaced resilient means first mentioned.

EDWARD L. ANDERSON.